(12) United States Patent
Bunte et al.

(10) Patent No.: US 10,484,520 B2
(45) Date of Patent: Nov. 19, 2019

(54) METHOD FOR OPERATING A COMMUNICATION NETWORK, COMMUNICATION NETWORK AND CONTROLLER

(71) Applicant: BECKHOFF AUTOMATION GMBH, Verl (DE)

(72) Inventors: Thorsten Bunte, Gütersloh (DE); Holger Büttner, Berlin (DE); Erik Vonnahme, Salzkotten (DE); Dirk Janssen, Verl (DE); Thomas Rettig, Rheda-Wiedenbrück (DE); Hans Beckhoff, Verl (DE)

(73) Assignee: Beckhoff Automation GmbH, Verl (DE)

( * ) Notice: Subject to any disclaimer, the term of this patent is extended or adjusted under 35 U.S.C. 154(b) by 12 days.

(21) Appl. No.: 15/983,722

(22) Filed: May 18, 2018

(65) Prior Publication Data

US 2018/0270336 A1    Sep. 20, 2018

Related U.S. Application Data

(63) Continuation of application No. PCT/EP2016/078403, filed on Nov. 22, 2016.

(30) Foreign Application Priority Data

Nov. 23, 2015  (DE) .................. 10 2015 120 242

(51) Int. Cl.
*H04L 29/06* (2006.01)
*H04L 12/40* (2006.01)

(52) U.S. Cl.
CPC ........ *H04L 69/28* (2013.01); *H04L 12/40013* (2013.01); *H04L 69/22* (2013.01); *H04L 69/26* (2013.01); *H04L 2012/4026* (2013.01)

(58) Field of Classification Search
CPC ......... H04L 29/06; H04L 12/40; H04L 69/28; H04L 69/22; H04L 12/40013; H04L 2012/4026
See application file for complete search history.

(56) References Cited

U.S. PATENT DOCUMENTS

2003/0023960 A1*  1/2003  Khan ................ H04L 29/06027
                                                          717/152
2003/0236937 A1* 12/2003  Barros De Almeida ....................
                                                          H04L 12/5692
                                                          710/305

(Continued)

FOREIGN PATENT DOCUMENTS

DE         3438791 A1    5/1985
DE        19803686 A1    8/1999

(Continued)

OTHER PUBLICATIONS

ATSC, "Standard for Transmitter Synchronization" Advanced Television Systems Committee, Apr. 8, 2011 (82 pages).

(Continued)

*Primary Examiner* — Chi Ho A Lee
(74) *Attorney, Agent, or Firm* — Dorsey & Whitney LLP (57) ABSTRACT

A first participant transmits a clocked data sequence to a second participant of a communication network, wherein one data unit of the data sequence is transmitted per clock cycle by the first participant and wherein the data sequence contains a datagram as a write datagram which contains a header, an intermediate field following the header and a data field following the intermediate header, wherein the header, the intermediate field and the data field in each case have one or more data units. The second participant reads the header of the datagram, defines input data depending on the content of the header within a response time, and records the input data in the datagram while the data sequence passes through (Continued)

the second participant. The length of the intermediate field of the datagram is matched to the clock frequency of the data sequence and the response time of the second participant.

21 Claims, 7 Drawing Sheets

(56) References Cited

U.S. PATENT DOCUMENTS

| | | | |
|---|---|---|---|
| 2005/0025054 A1* | 2/2005 | D. ............................ | H04L 43/50 370/235 |
| 2005/0180466 A1* | 8/2005 | Franchuk .............. | H04J 3/0638 370/503 |
| 2005/0182501 A1* | 8/2005 | Franchuk ........... | G05B 23/0229 700/81 |
| 2005/0259609 A1 | 11/2005 | Hansquine et al. | |
| 2006/0193343 A1* | 8/2006 | Shang ................... | H04L 1/0045 370/466 |
| 2009/0303898 A1* | 12/2009 | Isenmann .......... | G05B 19/4185 370/252 |
| 2012/0250700 A1* | 10/2012 | Wu ........................... | H04L 7/10 370/464 |
| 2013/0322462 A1* | 12/2013 | Poulsen .................... | H04J 3/06 370/458 |

FOREIGN PATENT DOCUMENTS

| | | |
|---|---|---|
| DE | 102007004044 A1 | 7/2008 |
| DE | 102008009835 A1 | 8/2009 |
| EP | 2527935 B1 | 12/2014 |

OTHER PUBLICATIONS

"Feldbus," Wikipedia, Nov. 10, 2015, English translation retrieved on May 17, 2018 (14 pages).

International Search Report for International Patent Application No. PCT/EP2016/078403, dated Feb. 9, 2017, English translation (3 pages).

* cited by examiner

METHOD FOR OPERATING A COMMUNICATION NETWORK, COMMUNICATION NETWORK AND CONTROLLER

CROSS-REFERENCE TO RELATED APPLICATIONS

This patent application is a continuation of International Patent Application No. PCT/EP2016/078403, filed Nov. 22, 2016, which claims priority to German Patent Application DE 102015120242.5, filed Nov. 23, 2015, entitled "Verfahren Zum Betreiben Eines Kommunikationsnetzwerkes, Kommunikationsnetzwerk, Steuervorrichtung und Datenverarbeitung und Datenverarbeitungsvorrichtung," each of which are incorporated by reference herein, in their entirety and for all purposes.

FIELD

The disclosure relates to a method for operating a communication network, a communication network, and a controller.

BACKGROUND

A communication network comprises a plurality of (i.e. at least two) participants which communicate with one another via suitable communication channels. The communication channels can be designed as wireless and wired channels. Information can be transmitted in the communication network from one participant to another participant in the form of discrete data packets (messages).

A transmission network is a network in which a data path passing through the participants is defined, via which the participants can receive and forward messages. A message transmitted by a controller as a first participant in the network passes through the data path and therefore the subsequent participants of the transmission network. While the message passes through one of the participants, the participant concerned has the facility to read data from the message or write data to the message. A message may contain one or more datagrams. Each datagram comprises at least a header and a data field following the header. The header is provided to accommodate status information and/or control information. The data field is provided to accommodate payload.

In a write procedure, a participant receives a datagram and defines input data depending on the content of the header of the datagram. The participant then writes the input data to the data field following the header. The definition of the input data depending on the content of the header takes a certain amount of time. This time is referred to as the response time of the participant concerned.

Since the length of the datagram is fixed, a time interval, the length of which is similarly fixed, i.e. may not be modified by the participant, occurs between the output of the datagram header and the output of the data field of the datagram (in each case at the output of the participant). In other words, the time of the output of the header is linked in a fixed manner to the time of the output of the data field. However, the participant cannot output the data field until it has defined the aforementioned input data and has written it to the data field. Since a certain amount of time (the aforementioned response time) is used for the definition of the input data, the participant cannot output the header at any random early time. Instead, it delays the output of the entire datagram by a time corresponding to the response time (otherwise the header and data field would be "torn apart").

In automation technology, different fieldbus protocols based on Ethernet at 100 Mbit/s have become established. Since Ethernet at 1 Gbit/s has now become prevalent in the consumer domain, it is desirable to transmit fieldbus protocols also at bit rates of 1 Gbit/s or more. At the same time, it is desirable not to have to clock the entire participant accordingly faster.

DE 198 03 686 A1 discloses a clocked fieldbus system with at least two participants which exchange messages bit-synchronously, wherein the processing time by the participants is taken into account by means of empty messages. Intermediate fields in messages which serve to fill the free space in payload fields which are not occupied with payload are known from DE 10 2007 004 044 A1 and DE 10 2008 009 835 A1.

SUMMARY

Embodiments of the invention provide an improved method for operating a communication network, an improved communication network and an improved controller.

According to one aspect, a method for operating a communication network, comprising: transmitting a clocked data sequence from a first participant to a second participant of the communication network, wherein one data unit of the data sequence is transmitted per clock cycle by the first participant and wherein the data sequence contains a datagram as a write datagram which contains a header, an intermediate field following the header and a data field following the intermediate header, wherein the header, the intermediate field and the data field in each case have one or more data units; reading of the header by the second participant; defining of input data by the second participant depending on the content of the header within a response time of the second participant; and recording of the input data in the datagram by the second participant while the data sequence passes through the second participant. The length of the intermediate field is matched to the clock frequency of the data sequence and the response time of the second participant.

According to another aspect, a communication network comprising a first participant and a second participant. The first participant transmits a clocked data sequence to the second participant, wherein the data sequence contains a datagram as a write datagram which contains a header, an intermediate field following the header and a data field following the intermediate header, wherein the header, the intermediate field and the data field in each case have one or more data units, and wherein the length of the intermediate field is matched to a clock frequency of the data sequence and a response time of the second participant. The second participant reads the header of the datagram, defines input data depending on the content of the header and records the input data in the datagram while the data sequence passes through the second participant.

According to another aspect, a controller for a communication network is provided. The communication network comprises a participant. The controller generates a clocked data sequence and forwards the clocked data sequence to the participant of the communication network. The data sequence contains a write datagram which contains a header, an intermediate field following the header and a data field following the intermediate field, wherein the header, the intermediate field and the data field comprise one or more data units, and wherein the length of the intermediate field is matched to a clock frequency of the data sequence and a response time of the participant.

The invention is explained in detail below with reference to the attached drawings. The same reference numbers denote the same or equivalent components.

DETAILED DESCRIPTION

A datagram from which a participant reads addressed data is referred to below as a read datagram and a datagram to which a participant writes addressed data is referred to as a write datagram. Messages may contain a plurality of datagrams, wherein the datagrams may be read datagrams or write datagrams. The possibility also exists for providing messages which comprise both read datagrams and write datagrams.

For operating a communication network, a clocked data sequence is transmitted from a first to a second participant of the communication network. The first participant transmits one data unit of the data sequence per clock cycle. The data sequence contains a write datagram which contains a header, an intermediate field following the header and a data field following the intermediate header. The header, the intermediate field and the data field in each case comprise one or more data units. The second participant reads the header and defines input data depending on the content of the header and independently from the content of the intermediate field within a response time of the second participant. The second participant writes the input data defined in this way to the write datagram while the data sequence passes through the second participant. The length of the intermediate field is matched to the clock frequency of the data sequence and the response time of the second participant.

The length of the intermediate field in the write datagram is matched to the clock frequency of the data sequence and the response time of the second participant in such a way that the second participant succeeds in defining the input data depending on the content of the header and in writing them to the data field of the datagram while the data field is available to the second participant for write access. The intermediate field enables a shorter transit time between the input and output of the second participant, i.e. a shorter transit time through the second participant. If the length of the intermediate field is sufficient, it is possible to output the header of the write datagram (and possibly further fields of the datagram located between the header and the intermediate field) at the output of the second participant without (as is otherwise necessary) allowing a certain waiting time to elapse in order to be able to output the data field with the fixed time interval between it and the header. At least in principle, a transit time through the second participant of only one clock cycle can now be implemented. In an embodiment of this type, the second participant first reads one data unit of the header of the write datagram in each case per clock cycle and defines the input data during the following clock cycles corresponding to the intermediate field depending on the content of the header that has just been read. The second participant then writes the input data defined in this way to data field of the write datagram while the data field passes through the second participant (one data unit of the data field per clock cycle).

In one embodiment, the intermediate field consists only of a sequence of filler bits (dummy bits or empty bits). A filler bit or dummy bit or empty bit is a bit whose content is not evaluated. The intermediate field may, for example, be a finite sequence of zero bits. In an embodiment of this type, the sole purpose of the intermediate field is to increase the time interval between the header and the data field in order to enable the fastest possible forwarding of the individual data units of the write datagram through the second participant. The shortening of the transit time is accompanied in this case by a lengthening of the message with constant volume of the payload in the message. This may result in a reduction in the effective data rate (e.g. if the lengthening of the messages has the result that fewer messages can be transmitted per time unit). In such a case, it is conceivable for the selection of the length of the intermediate field to represent a compromise between transit time and effective data rate. It will be noted that the intermediate field has a certain minimum length in order to enable a minimum transit time of the transmitted data sequence in the communication network.

This minimum length is also referred to below as the optimum length of the intermediate field. If a shorter length (i.e. shorter than the optimum length) is selected for the intermediate field, this may require a lengthening of the transit time through at least one of the participants of the communication network, but the message will then be shorter, i.e. it will be possible to transmit more datagrams per time unit. A shortened intermediate field (i.e. an intermediate field with a length which is shorter than the optimum length) may be appropriate, particularly if many messages are intended to be transmitted in rapid succession (i.e. at short time intervals), so that the individual messages may not become longer. However, if the maximization of the payload transmitted per time unit (i.e. the payload data rate or effective data rate) is not the decisive criterion, it may be appropriate to choose the optimum length defined above for the intermediate field.

The optimum length of the intermediate field (i.e. the minimum length for achieving the shortest possible transit time) depends on the clock frequency of the data sequence and on the response time of the second participant. The higher the clock frequency of the data sequence and the longer the response time of the second participant, the longer the optimum length of the intermediate field will be. According to one embodiment, the header contains an indication of the length of the intermediate field. In this way, every participant which receives the data sequence is enabled to identify the start of the data field. Alternatively, it is conceivable, for example, for each datagram in the data sequence to contain an intermediate field, wherein the length of the intermediate field is the same for all datagrams. In this case, it would suffice, for example, to program each participant according to the length of the intermediate field which is the same for all datagrams, e.g. during a commissioning of the communication network or after each adaptation of the length of the intermediate field.

It should be noted at this point that all disclosed features of the first participant and the second participant can be implemented in an identical or similar manner in every other participant of the communication network.

According to one embodiment, the datagram is a write datagram and the message furthermore contains a read datagram which contains a header and a data field immediately following the header. The read datagram consequently contains no intermediate field which would be comparable with the intermediate field of the write datagram. This embodiment is based on the realization that a read access to the data field by the second participant, unlike a write access, is temporally unproblematic, since the second participant does not have to provide any data for the read access.

According to one embodiment, the header contains an address and the second participant determines the input data by reading the input data from a memory area designated with the address. The retrieval of the data from the memory area may take a certain amount of time. In some embodiments, the aforementioned response time may consist largely of the time for the retrieval of the input data from the memory area.

According to one embodiment, an input and an output of the second participant are interconnected via a shift register. The shift register is clocked at the clock frequency and is passed through by the data sequence. The shift register may, for example, have a read segment and a write segment downstream of the read segment, wherein the second participant is capable of reading data from the read segment (and therefore from the data sequence) and of writing data (e.g. the aforementioned input data) to the write segment (and therefore to the data sequence). While the header passes through the read segment, the second participant reads the header from the read segment. A certain amount of time later, i.e. while the input field passes through the write segment, the second participant writes the input data to the write segment and therefore to the data field of the datagram.

The shift register may furthermore have an intermediate segment located between the read segment and the write segment. The intermediate segment has the effect that it lengthens the time between the read procedure and the write procedure. If the intermediate segment is sufficiently long (i.e. has at least the optimum length), the aforementioned intermediate field can be dispensed with. However, if the length of the intermediate field is shorter than the optimum length, the intermediate segment provides the second participant with sufficient time to determine the input data after reading the header and write it to the write segment of the shift register. The longer the intermediate segment, the longer the transit time through the second participant will also be. In one variant of this embodiment, the write segment is not positioned downstream of the read segment, but the two segments partially or completely overlap one another.

According to one embodiment, the shift register comprises only one single memory element which accommodates precisely one data unit of the data sequence in each clock cycle of the data sequence. In this case, the shift register and therefore the second participant have a transit time of precisely one clock cycle of the data sequence. The second participant then receives one data unit of the data sequence in one clock cycle and outputs the same data unit (with changed or unchanged content) at its output already in the next clock cycle.

According to one embodiment, the length of the shift register and the length of the intermediate field are matched to one another. Alternatively or additionally, the method may comprise a measure with which the length of the shift register and the length of the intermediate field are matched to one another. The measure may comprise, for example, a minimization of the length of the shift register with a given length of the intermediate field or a minimization of the length of the intermediate field with a given length of the shift register.

In many applications, it may be appropriate to minimize the transit time through the second participant and to select the shift register as short as possible and the intermediate field as long as necessary for this purpose. Conversely, in other applications (e.g. if a high effective data transmission rate is desired or if the message is intended to be as short as possible for other reasons), it may be appropriate to lengthen the transit time through the second participant and shorten the intermediate field.

According to one embodiment, the intermediate field contains at least one empty element. An empty element (in this application also referred to as a filler element or dummy element) is a data unit whose content is not evaluated in the method. The content of the empty element (i.e. the values of the bits of the empty element) is therefore irrelevant. Instead, every empty element in the intermediate field serves merely to provide the intermediate field with a certain length.

According to one embodiment, the intermediate field may also contain status information such as interrupts, etc., which are read in by the participant. The reading of status information of this type into the intermediate field does not undermine the objective of lengthening the time for addressing the first data byte, since this status information is not selected via the address field, but is held ready in advance or permanently by the participant. Alternatively, the intermediate field may also be used to distribute unaddressed data to the participant similar to a broadcast message. The effectiveness of the data transmission is hereby increased.

According to one embodiment, the data sequence contains a plurality of write datagrams. Each of these datagrams in each case contains a header, an intermediate field following the header and a data field following the intermediate field. The length of the intermediate field can be matched in each case to the clock frequency of the data sequence and to a response time of at least one of the participants. The datagrams are transmitted successively. Each of the datagrams can be addressed to one specific or to a plurality of specific participants of the communication network. The datagrams may, for example, be segments of one message. The data sequence may contain further datagrams (for example one or more read datagrams) which do not necessarily contain an intermediate field.

According to one embodiment, the length of the intermediate field (intermediate field length) is the same in all write datagrams. The intermediate field length can then be defined, for example, in a header of a message comprising the datagrams. In one alternative design, the intermediate field length is stored in each participant (e.g. in a register provided specifically for this purpose).

According to one embodiment, the data sequence contains a message which contains a message header and a plurality of datagrams following the message header. A specific participant, for example, can be addressed with each datagram. A synchronous control of the participants (e.g. devices in an automated production plant), for example, can thus be implemented. A data sequence of this type is implementable, for example, in EtherCAT systems.

According to one embodiment, the length of the intermediate field and the clock frequency of the data sequence are matched to one another. Alternatively or additionally, the method may comprise a measure with which the length of the intermediate field and the clock frequency are matched to one another. The measure may comprise, for example, a minimization of the length of the intermediate field with a given clock frequency or a maximization of the clock frequency with a given length of the intermediate field. An increase in the clock frequency generally results in a shorter transit time through each participant. A lengthening of the intermediate field allows the use of higher clock frequencies, since it provides each participant with more time to read the datagram header, to define the input data and to write the input data to the data field of the datagram, even in the case of a shortened transit time.

According to one embodiment, the method comprises a configuration measure with which the transit time through the second participant (i.e. the transit time from the input to the output of the second participant) is set on the basis of the length of the intermediate field and the clock frequency. In one special embodiment, the second participant is operated in such a way that it sets its transit time independently on the basis of the length of the intermediate field and the clock frequency. This can be done, for example, in a configuration phase, for example using test datagrams, wherein a test is carried out to determine whether the test datagrams are correctly processed.

According to one embodiment, the second participant indicates the response time of the second participant to the first participant. The second participant (e.g. a slave participant) thus enables the first participant (e.g. a master participant) to set a suitable length of the intermediate field. According to one special embodiment, each of the participants which process a datagram or message transmitted by the first participant on the fly indicates its respective response time to the first participant. The participants thus enable the first participant (e.g. the master participant) to set a length of the intermediate field sufficient for all participants.

According to one embodiment, the first participant (e.g. a master participant) indicates the length of the intermediate field to the second participant (e.g. a slave participant). The second participant is thus enabled to reduce its transit time as far as possible depending on the length of the intermediate field. The second participant is furthermore enabled to process the write datagrams correctly (e.g. to write in input data at the correct position of the datagram). According to one embodiment, the first participant indicates the length of the intermediate field by writing an indication of the length of the intermediate field to the clocked data sequence transmitted by it, for example to the header of each transmitted message or (insofar as a message contains a plurality of datagrams in each case with intermediate fields of different lengths) to the header of each datagram.

In a different embodiment, the first participant communicates the length of the intermediate field to the second participant (and, where relevant, other participants) in a separate configuration signal, for example during a configuration phase in the operation of the communication network.

The communication network is characterized in that it is configured to carry out a method according to one of the above-mentioned embodiments.

The communication network may, for example, be a fieldbus system. According to one embodiment, the communication system uses an Ethernet protocol. Alternatively, other communication protocols can be used.

According to one special embodiment, the communication network is an EtherCAT network. An EtherCAT network is a fieldbus system specially developed by Beckhoff Automation, based on the Ethernet protocol.

The controller for use as a first participant in a communication network is configured to generate a clocked data sequence and to output the clocked data sequence on one output of the controller for forwarding to a second participant of the communication network. The controller generates one data unit of the data sequence per clock cycle. The data sequence contains a write datagram which contains a header, an intermediate field following the header and a data field following the intermediate field. The header, the intermediate field and the data field in each case comprise one or more data units. As already mentioned above, a data unit is a finite bit sequence with a fixed length, wherein the length is the same for all data units. A data unit may, for example, be a bit, a byte (8 bits) or any other data unit. The header, the intermediate field and the data field in each case comprise one or more data units. One or more clock cycles are assigned accordingly in each case to the header, the intermediate field and the data field. The controller is characterized in that the length of the intermediate field can be matched to the clock frequency of the data sequence and to the response time of the second participant. This offers the advantages mentioned above with reference to the method.

The data processing device for use as a second participant in a communication network is configured to receive a clocked data sequence, wherein it receives one data unit of the data sequence per clock cycle. The data processing device is configured, in particular, for the reception and processing of a data sequence which contains a datagram which contains a header, an intermediate field following the header and a data field following the intermediate field, wherein the header, the intermediate field and the data field in each case comprise one or more data units. The data processing device is characterized in that it reads the header of the datagram while the datagram passes through the data processing device and defines input data depending on the content of the header and independently from the content of the intermediate field within a response time and writes the input data to the data field of the datagram.

Figure 1:
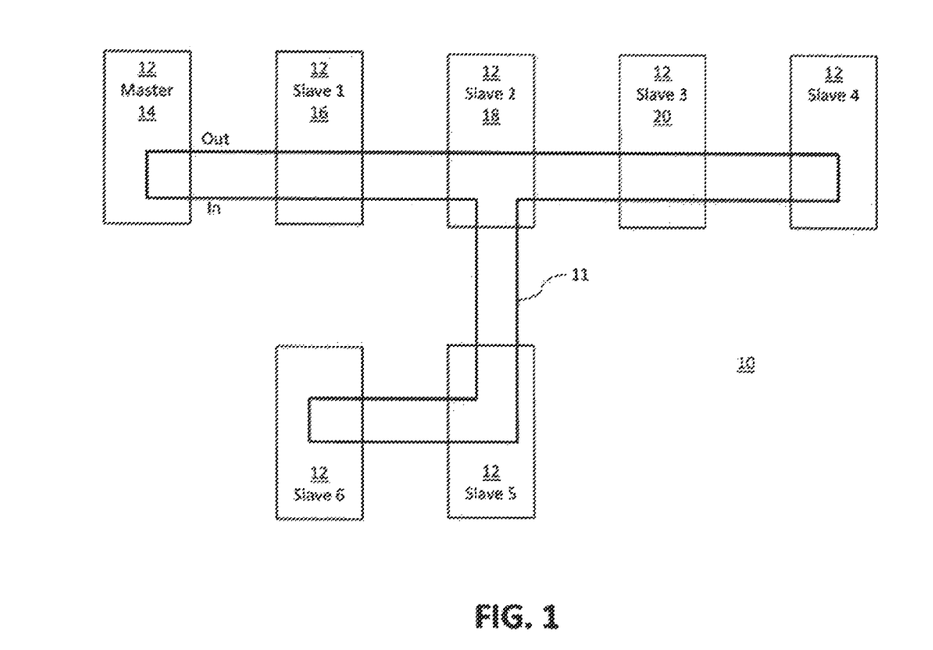
FIG. 1 shows schematically an example of an embodiment of a communication network.

The example of a communication network 10 outlined in FIG. 1 comprises a plurality of participants 12 which communicate with one another via a data path 11 using communication technology. In operation, messages are transmitted along the data path 11. As an example, it is assumed that a first participant 14 (e.g. a master participant) transmits a message which then passes through the further participants 12 along the data path 11 and is processed by the participants. Each of the participants 12 is passed through by at least one segment of the data path 11.

A segment length (measured e.g. in data units) and a corresponding transit time (measurable e.g. in clock cycles) can be allocated to each segment of the data path 11 which extends from an input of one of the participants 12 to a corresponding output of the same participant. The length of a given segment and the transit time allocated to it are related to one another as follows: transit time=segment length: data rate. The data rate is understood to mean the number of transmitted data units per time interval, i.e. the reciprocal of the clock cycle.

An increase in the data rate (i.e. a faster clocking of the data sequence transmitted by the first participant 14) results accordingly in a shorter transit time on each segment of the data path 11. The higher the data rate, the less time there is available to each participant to define input data after receiving a first segment of the clocked data sequence and to write them to a specific subsequent segment of the data sequence provided for this purpose.

With an excessively high clock frequency, the case may occur where the segment of the data sequence provided to accommodate the input data has already passed through the second participant 16 while the second participant 16 is still busy defining the input data. The clock frequency of the communication network (i.e. the clock frequency of the data sequence passing through the participants) cannot therefore be readily increased in any given manner. By the same token, the transit time from one given participant to another participant cannot be readily shortened by increasing the clock frequency.

This difficulty is overcome by providing an intermediate field in the datagram, as will be explained in detail below with reference to FIGS. 4 to 6. Data rates of more than 1 Gbit/s (corresponding to a clock frequency of more than 1 GHz) are therefore then implementable, for example, in an EtherCAT network.

Figure 2:
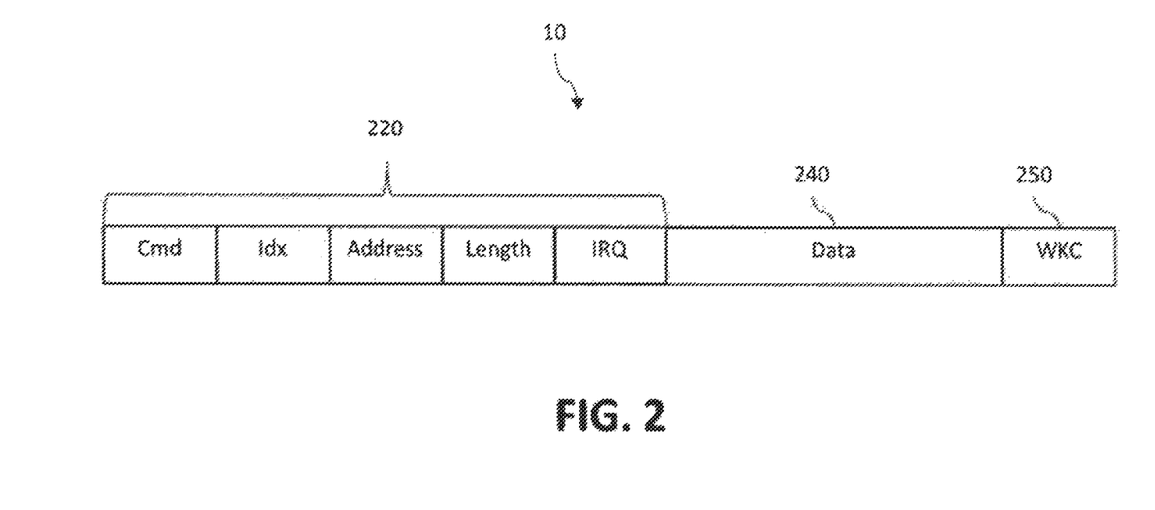
FIG. 2 shows schematically an example of a conventional embodiment of a datagram.

FIG. 2 shows schematically an example of a conventional embodiment of a datagram 10 which has a command field CMD, an identification field IDX, an address field ADDRESS, a length field LENGTH, an interrupt field IRQ, a data field DATA and an end field WKC. The fields of the datagram 200 are shown in chronological order in FIG. 2. This means that first the field CMD, then the field IDX, then the field ADDRESS, etc., are transmitted. The fields of the datagram located upstream of the data field DATA are referred to collectively as the header 220. In the example, the header 220 comprises the fields CMD; IDX, ADDRESS, LENGTH and IRQ. The content of a field in a data sequence is understood to mean the current value or the status of the field, i.e. the value indicated by the field. An individual bit has, for example, either the value 0 or 1.

The command field CMD indicates the manner in which the datagram 200 is intended to be processed in a participant. In one embodiment, for example, a first value of the command field CMD can characterize the datagram as a read datagram, i.e. as a datagram whose data (the content of the data field DATA) are intended to be read by the addressed participant. A different, second value of the command field CMD can characterize the datagram 200 as a write datagram, i.e. as a datagram whose data field DATA is intended to accommodate data from the addressed participant. The first participant 14 can assign received datagrams to the transmitted datagrams with the identification field IDX. One or more participants for which the datagram is defined can be selected with the address field ADDRESS, and a specific memory location (e.g. in the addressed participant) can be indicated. The length field LENGTH indicates the length of the data field DATA. The interrupt field IRQ can define an interrupt triggered by a participant. Payload can be transmitted with the data field DATA (data field 240), for example data defined for the second participant 16 (input data; in this case, the datagram is a read datagram) (see FIG. 1), or data to be input by the second participant 16 (output data; in this case, the datagram is a write datagram). The structure of a datagram outlined here is only an example. In a different example, the header comprises fields other than those shown here. In a further example, the datagram contains no end field WKC.

It is assumed below as an example that the clocked data sequence (which contains the datagram 200) is transmitted by the first participant 14 and is received by the second participant 16. It is furthermore assumed that the command field CMD and the address field ADDRESS characterize the datagram 200 as a write datagram addressed to the second participant 16. The second participant 16 first receives the header of the datagram 200 and recognizes on the basis of the identification field IDX and the command field CMD that it is intended to fetch data from the memory area (e.g. an internal memory area of the second participant 16) designated with the address field ADDRESS and the length field LENGTH and to write them to the data field DATA. The second participant 16 accordingly requests the content of the designated memory area. A time referred to in this application as the response time passes between the time of the reading of the fields ADDRESS and LENGTH and the receipt of the requested memory data. The second participant 16 then writes the obtained memory data (i.e. the content of the memory area defined by ADDRESS and LENGTH) as input data to the data field DATA. A prerequisite for this is that the data field DATA has not yet passed through the second participant 16 at this time. This is achieved, for example, by selecting a sufficiently low clock frequency, so that a sufficiently long transit time from the input to the output of the second participant 16 is guaranteed. In this conventional embodiment, the clock frequency cannot be increased in any given manner due to the significant response time of the second participant 16.

Figure 3:
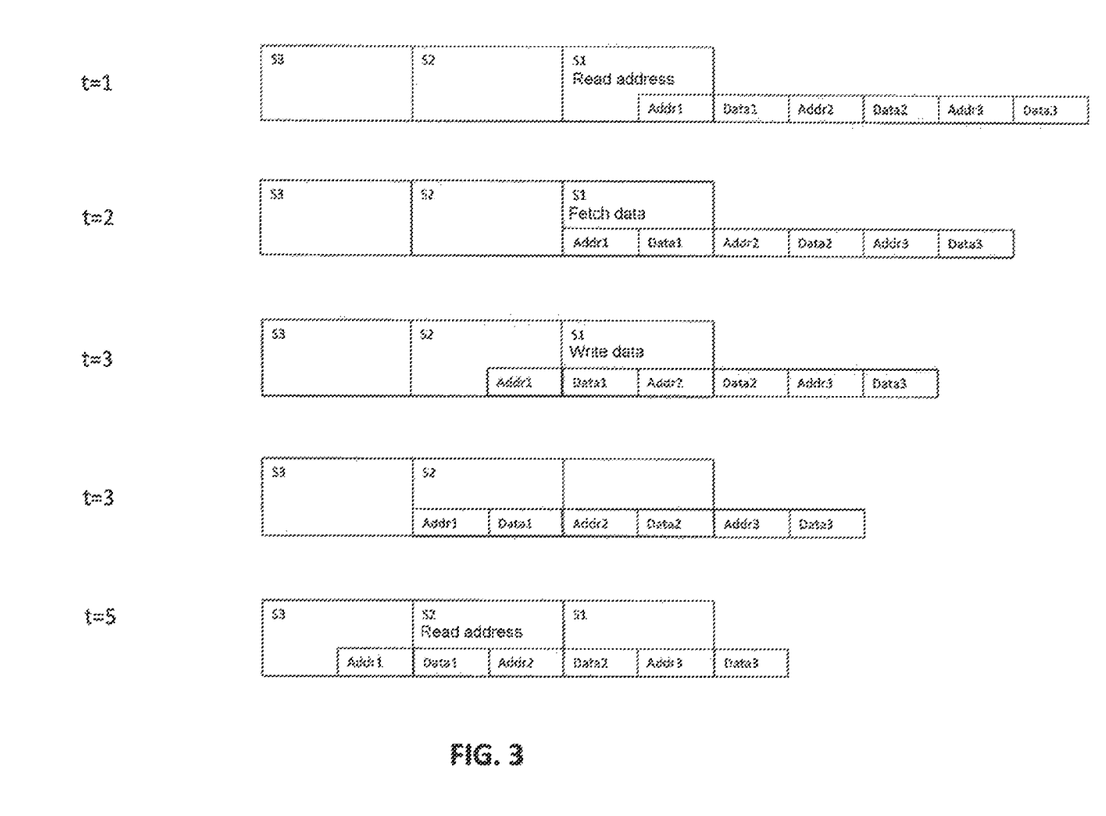
FIG. 3 shows schematically an example of a conventional embodiment of a method for operating a communication network.

FIG. 3 shows an example of a conventional embodiment of a method for the processing of a data sequence on the fly by a plurality of participants. In the example, the data sequence passes successively through the three participants S1, S2 and S3 (e.g. the slave participants 16, 18, 20 in FIG. 1). In the example, the data sequence comprises three consecutive datagrams which in each case contain an address field ADDR1 or ADDR2 or ADDR3 and a data field DATA1 or DATA2 or DATA3 following the respective address field. For the sake of simplicity, it is assumed here that the address fields and the data fields consist in each case of precisely one data unit. If the data path on which the data sequence is transmitted is regarded as a shift register, this means that the address fields and the data fields are advanced in each case by one position in the shift register per clock cycle.

The drawing illustrates the position of the data sequence on the data path at five consecutive times t=1 to t=5, wherein the length of a clock cycle has been selected as the time unit. At the time t=1, the address field ADDR1 of the first datagram has reached the participant S1 and S1 reads the memory address indicated in the address field ADDR1. At the time t=2, S1 fetches input data from a memory area designated with the address. At the time t=3, S1 writes the input data to the data field DATA1 of the first datagram, which is possible because DATA1 is still located inside the participant S1 at this time. The subsequent datagrams (ADDR2, DATA2) and (ADDR3, DATA3) are processed by the participants S2 and S3 downstream of the participant S1 in a similar manner. In the example, the address field ADDR2 of the second datagram (ADDR2, DATA2) has reached the participant S2 at the time t=5 and is then read by S2. The further processing is carried out at later times.

According to one embodiment, the individual participants (in FIG. 3, the participants S1, S2 and S3) are addressed via the sequence of the datagrams. In this case, the address field ADDRESS described above (or other indication for addressing one or more participants) can be dispensed with.

In a different embodiment, which is implementable, for example, in EtherCAT, each datagram contains an address field, e.g. the address field ADDRESS (see above) for addressing one or more participants for which the datagram concerned is defined. This allows the datagrams to be transmitted in any given sequence. This means that the sequence of the datagrams in the message is random. The sequence of the datagrams in the message can be selected, in particular, independently from the sequence of the participants on the data path. The method outlined in FIG. 3 (in which it has been assumed for simplification that each datagram comprises only one address field and one data field) is readily transferable to embodiments in which each datagram contains an address field (e.g. ADDRESS) for addressing one or more participants. The same applies accordingly to the method described below with reference to FIG. 5.

Figure 4:
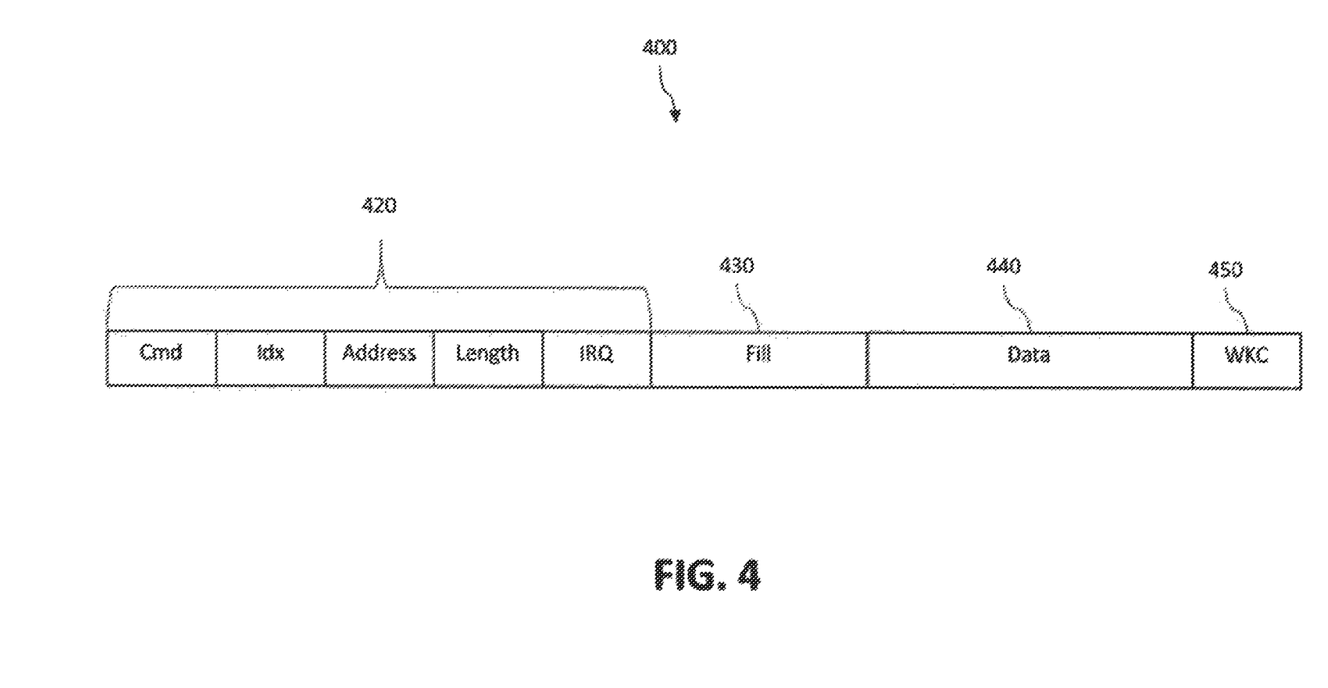
FIG. 4 shows schematically an example of an embodiment of a datagram.

The example of a datagram 400 outlined in FIG. 4 contains a header 420, an intermediate field 430 following the header and a data field 440 following the intermediate field 430. The datagram 400 may furthermore have an end field 450 following the data field 440. The header 420 and the data field 440 are comparable with the header 220 and the data field for 240 of the datagram 200 shown in FIG. 2 and may be structured and processed in the same way as the latter. A participant, for example, which is intended to write input data to the data field 440 can be selected with the control field 420 (e.g. with the address field ADDRESS contained therein). The intermediate field 430 serves primarily or exclusively to provide a spacing between the header 420 and the data field 440 in order to enable a participant, even in the case of a very short transit time of the datagram 400 through the participant concerned, to define input data depending on the content of the header 420 and to write the input data defined in this way in a timely manner to the data field 440. The length of the intermediate field 430 can be matched to the clock frequency at which the data units of the datagram 400 are transmitted, and to the response time of the participant or participants which are intended to process the datagram 400. If the clock frequency is intended to be increased, the intermediate field will generally have to be lengthened.

The intermediate field 430 may be advantageous at least if the datagram 400 is a write datagram, i.e., in the specific example, if the command field CMD characterizes the datagram 400 as a write datagram. A write datagram is generally any datagram which causes a participant to write data to the data field of the datagram. Conversely, a read datagram is any datagram which causes a participant to read data from the data field of the datagram.

The data sequence may contain both write datagrams and read datagrams. In a read datagram, an intermediate field between the header and data field would normally yield no benefit, but would only lengthen the read datagram unnecessarily. In some embodiments, the header is therefore followed immediately by the data field in a read datagram. This means that an intermediate field is not provided in the read datagram. A read datagram may, for example, be structured in the same way as the datagram 200 shown in FIG. 2, where the header 220 is followed immediately by the data field 240.

Figure 5:
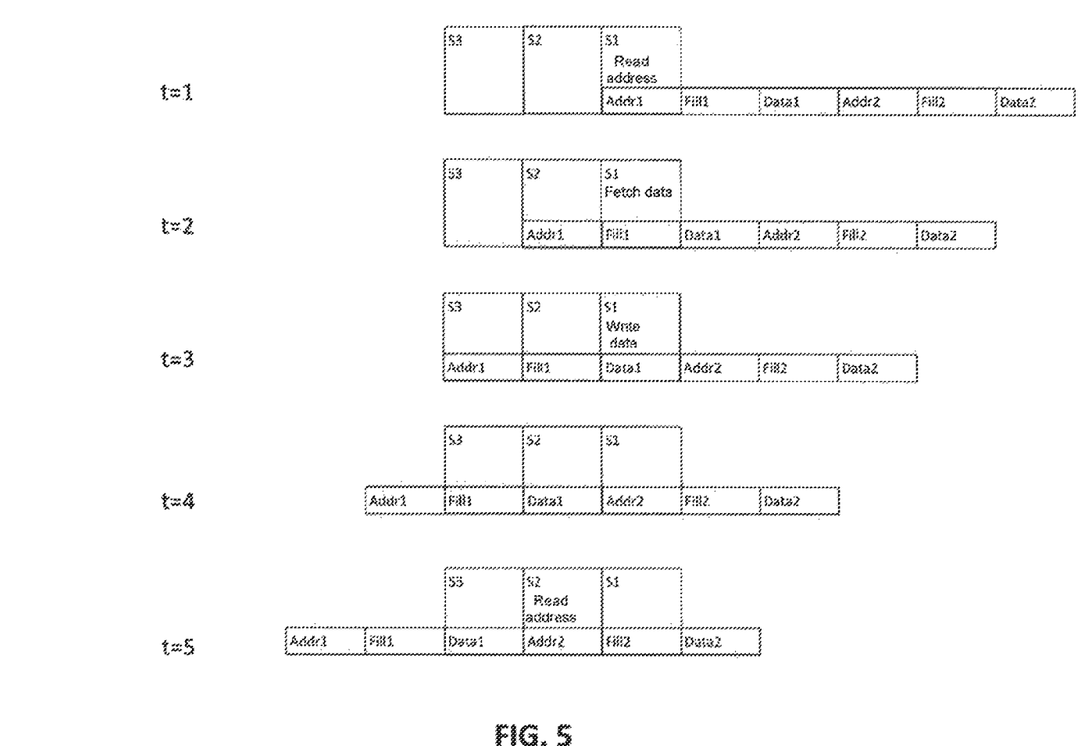
FIG. 5 shows schematically an example of an embodiment of a method for operating a communication network.

FIG. 5 shows schematically an example of a clocked data sequence which contains two consecutive datagrams, i.e. a first datagram and a following second datagram. The first datagram (ADDR1, FILL1, DATA1) comprises an address field ADDR1, an intermediate field FILL1 following the address field, and a data field following the intermediate field. The second datagram (ADDR2, FILL2, DATA2) is structured in a similar manner and comprises an address field ADDR2, an intermediate field FILL2 and a data field DATA2 following the intermediate field. In the example, the address fields ADDR1 and ADDR2 in each case form a header of the datagram concerned. In practice, a header of a datagram will normally not only consist of an address field, but will contain additional fields, but additional fields of this type are irrelevant to the present simplified description. In each clock cycle, the data sequence (as described above with reference to FIG. 3) advances in each case by one data field and thus passes through the participants, here the participants S1, S2 and S3. In the drawing, the data sequence is shown in each case at five consecutive times t=1 to t=5, wherein the length of a clock cycle has been selected as the time unit, as in FIG. 3. At the time t=1, the participant S1 evaluates the header of the first datagram, for example by reading a memory address from the address field contained in the header. At the following time t=2, the participant S1 defines input data depending on the content of the header while it is passed through by the intermediate field FILL1. In the example shown, the participant S1 defines the input data by reading them from a memory area designated with the address field ADDR1. At the time t=3, the participant S1 writes the determined input data to the input field DATA1. The transit time of each data unit of the clocked data sequence through each of the participants S1, S2, S3 is recognizably shorter in comparison with the processing diagram according to FIG. 3, i.e. in this example, it amounts to only one clock cycle instead of the two clock cycles in FIG. 3.

Figure 6:
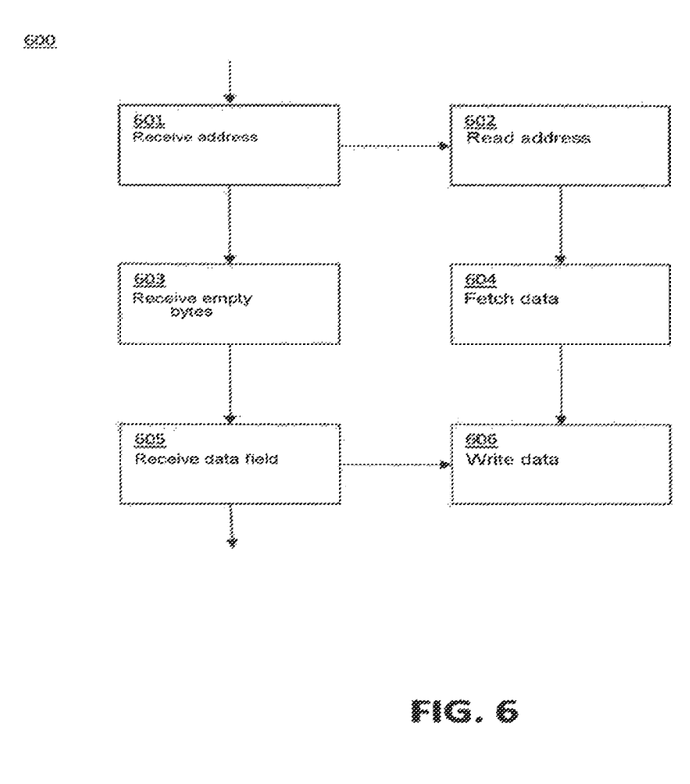
FIG. 6 shows a flow diagram of an example of an embodiment of a method for processing a datagram in a participant of the communication network.

The flow diagram in FIG. 6 illustrates an example of a method 600 for processing a data sequence in a participant of the communication network. The participant may, for example, be one of the participants 12 of the communication network described with reference to FIG. 1. In the method, the participant first receives a memory address (step 601), where relevant together with an indication of the length of the addressed memory area. The participant reads the received address and, where relevant, the further information (step 602) received in step 601 and fetches data from a memory area designated with the address (step 604). Meanwhile, the participant receives an intermediate field of the data sequence (step 603). The intermediate field may contain one or more empty bytes (i.e. dummy bytes) which have no purpose other than to delay the reception of a data field following the header (step 605). As a result, the participant has already completed step 604 (obtaining the input data) at the time when a write access to the data field of the data sequence is possible, so that the input data are then also actually available to it. After receiving the data field (step 605) and obtaining the data (step 604), the participant then writes the data to the data field (step 606).

As an alternative to a filling of the intermediate field with empty bytes, the intermediate field can also be used to transmit payload of this type which is essentially always provided already by the participant or which have already been read out in the participant before the arrival of the write datagram, e.g. interrupts and other status information. The reading of data of this type into the intermediate field does not undermine the objective of lengthening the time for addressing the first data byte, since this status information has not been selected via the address field, but is held ready permanently or in advance by the participant. The additional bytes in the intermediate field can also be used to distribute unaddressed data to the participants, similar to a broadcast message.

Figure 7:
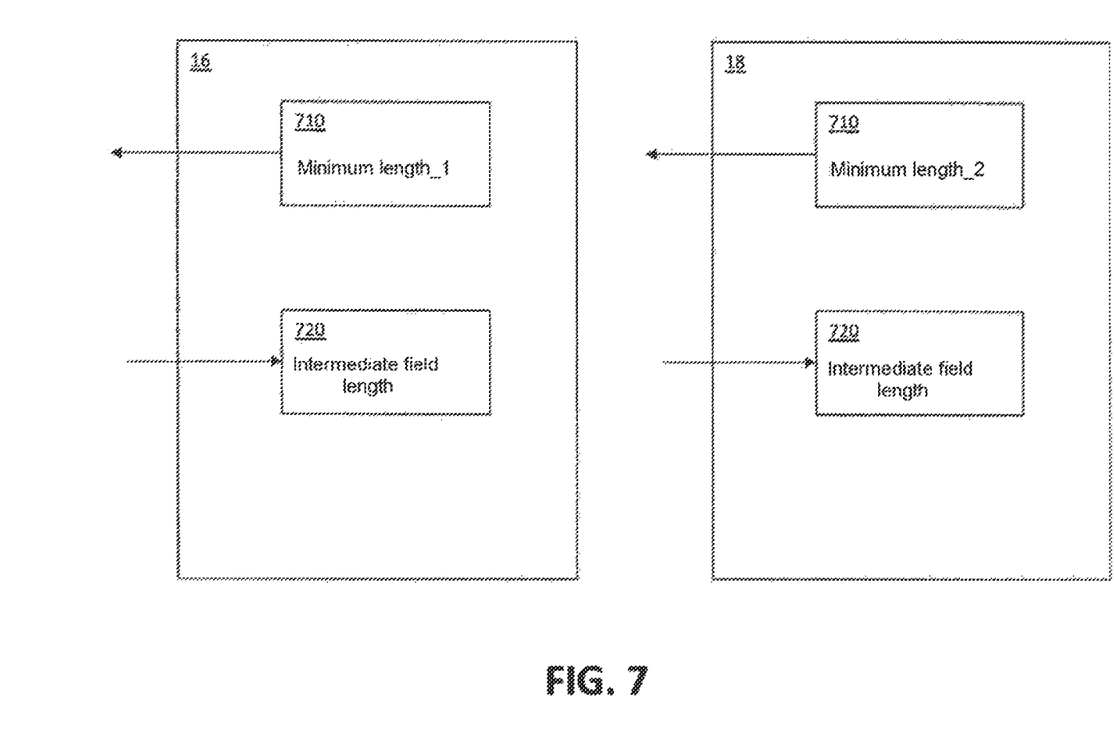
FIG. 7 shows schematically an example of an embodiment of a second and a third participant.

In the embodiment outlined in FIG. 7, each (or at least one) of the participants of the network has a first memory device 710 (e.g. a first register) in which a minimum length for the intermediate field is recorded. The minimum length can be selected in such a way that it allows a minimum transit time in the participant concerned. The minimum length may depend on the implementation of the participant concerned. Each (or at least one) of the participants furthermore has a second memory device 720 (e.g. a second register) in which an actual length of the intermediate field can be recorded. In operation, each of the participants adjusts its transit time according to the actual length of the intermediate field recorded in the second memory device. According to one special embodiment, the first participant 14 (see FIG. 1) selects the maximum of the minimum lengths indicated in each case by the other participants (e.g. the participants 16 and 18) as the intermediate field length to be used and records the selected intermediate field length in the respective second memory devices 720 of the participants 12.

In this application, it is assumed that the bit length of a datagram is not changed while the datagram passes through the data path. An adaptation of the bit length of the datagram during a pass may require additional technical measures. Each datagram consequently has a fixed bit length. However, this does not exclude the possibility of different datagrams in a message having different bit lengths or of a datagram in a subsequent message having a bit length which differs from that of a corresponding datagram in an earlier message.

A data unit is a finite bit sequence with a fixed length. A data unit may, for example, be a bit, a byte (8 bits), 16 bits, 32 bits or 64 bits. A plurality of data units in each case have the same fixed length.

A transit time through a participant is the time period between the reception of a bit at the input of the participant and the output of the same bit at the output of the participant. This means that the transit time through the participant is the transit time of the bit from the input to the output of the participant.

The transmission duration of a datagram is the time which the datagram uses in order to pass a given point on the data path. If the datagram is made up of N bits (i.e. if its bit length is N), the transmission duration of the datagram is N*BR, wherein BR is the bit rate. The bit rate is the number of bits which are transmitted per time unit.

The above-described properties, features and advantages of this disclosure and the way in which they are achieved will become clearer and more clearly understood in association with the description of the exemplary embodiments which are explained in greater detail in association with the drawings.

The invention has been illustrated and described in detail with the aid of the preferred exemplary embodiments. Nevertheless, the invention is not restricted to the examples disclosed. Rather, other variants may be derived therefrom by a person skilled in the art without departing from the protective scope of the invention as claimed.

What is claimed is:

1. A method for operating a communication network, comprising:
    transmitting a clocked data sequence from a first participant to a second participant of the communication network, wherein one data unit of the data sequence is transmitted per clock cycle by the first participant and wherein the data sequence contains a datagram as a write datagram which contains a header, an intermediate field following the header and a data field following the intermediate header, wherein the header, the intermediate field and the data field in each case have one or more data units;
    reading of the header by the second participant;
    defining of input data by the second participant depending on the content of the header within a response time of the second participant; and
    recording of the input data in the datagram by the second participant while the data sequence passes through the second participant,
    wherein a length of the intermediate field is matched to a clock frequency of the data sequence and the response time of the second participant.

2. The method according to claim 1, wherein an input and an output of the second participant are interconnected via a shift register which is clocked at the clock frequency and is passed through by the data sequence, wherein a length of the shift register and the length of the intermediate field are matched to one another.

3. The method according to claim 1, wherein the intermediate field of the datagram contains at least one empty element.

4. The method according to claim 1, wherein the intermediate field of the datagram contains at least one unaddressed data unit which is read by the second participant.

5. The method according to claim 1, wherein at least one data unit which is held ready in advance or permanently by the second participant is read by the second participant into the intermediate field.

6. The method according to claim 1, wherein the data sequence contains a plurality of write datagrams, wherein each of these write datagrams in each case contains a header, an intermediate field following the header and a data field following the intermediate field, wherein the length of the intermediate field is matched in each case to the clock frequency of the data sequence and to a response time of at least one of the participants.

7. The method according to claim 6, wherein the length of the intermediate field of the datagram is the same for each of the write datagrams.

8. The method according to claim 6, wherein the length of the intermediate field of the datagram is matched to the response time of the participant with the longest response time in the communication network.

9. The method according to claim 1, wherein the length of the intermediate field of the datagram and the clock frequency are matched to one another.

10. The method according to claim 1, wherein the second participant sets its transit time (or duration for one bit) on the basis of the length of the intermediate field of the datagram and the clock frequency.

11. The method according to claim 1, wherein the second participant indicates the response time of the second participant to the first participant.

12. The method according to claim 1, wherein the first participant indicates the length of the intermediate field of the datagram to the second participant.

13. A communication network comprising a first participant and a second participant,
    wherein the first participant transmits a clocked data sequence to the second participant,
    wherein the data sequence contains a datagram as a write datagram which contains a header, an intermediate field following the header and a data field following the intermediate header, wherein the header, the intermediate field and the data field in each case have one or more data units, and wherein a length of the intermediate field is matched to a clock frequency of the data sequence and a response time of the second participant, and wherein the second participant reads the header of the datagram, defines input data depending on the content of the header and records the input data in the datagram while the data sequence passes through the second participant.

14. The communication network according to claim 13, wherein second participant comprise a shift register interconnecting an input and an output of the second participant, the shift register being clocked, wherein a length of the shift register and the length of the intermediate field of the datagram are matched to one another.

15. The communication network according to claim 13, comprising a plurality of second participants, wherein the length of the intermediate field of the datagram is matched to the response time of the participant of the plurality of second participants with the longest response time.

16. The communication network according to claim 13, wherein the second participant sets its transit time (or duration for one bit) on the basis of the length of the intermediate field of the datagram and the clock frequency.

17. The communication network according to claim 13, wherein the second participant indicates the response time of the second participant to the first participant.

18. The communication network according to claim 13, wherein the first participant indicates the length of the intermediate field of the datagram to the second participant.

19. The communication network according to claim 13, wherein the communication network is a fieldbus system.

20. The communication network according to claim 13, wherein the communication network is an EtherCAT network.

21. A controller for a communication network, the communication network having a participant, wherein the controller generates a clocked data sequence and forwards the clocked data sequence to the participant of the communication network, the data sequence containing a write datagram which contains a header, an intermediate field following the header and a data field following the intermediate field, wherein the header, the intermediate field and the data field comprise one or more data units, and wherein a length of the intermediate field is matched to a clock frequency of the data sequence and a response time of the participant.

* * * * *